United States Patent [19]
Khalid

[11] Patent Number: 5,357,748
[45] Date of Patent: Oct. 25, 1994

[54] COMPRESSOR VANE CONTROL FOR GAS TURBINE ENGINES

[75] Inventor: Syed J. Khalid, Palm Beach, Fla.

[73] Assignee: The United States of America as represented by the Secretary of the Air Force, Washington, D.C.

[21] Appl. No.: 973,440

[22] Filed: Nov. 9, 1992

[51] Int. Cl.$^5$ ............................................. F02C 9/20
[52] U.S. Cl. .................... 60/204; 60/39.03; 60/39.29; 60/236
[58] Field of Search .............. 60/39.03, 39.161, 39.27, 60/39.29, 233, 236, 204

[56] References Cited

U.S. PATENT DOCUMENTS

| | | | |
|---|---|---|---|
| 4,514,137 | 4/1985 | Elliott | 415/1 |
| 4,594,050 | 6/1986 | Gaston | 415/1 |
| 4,831,535 | 5/1989 | Blotenberg | 364/431.02 |
| 4,944,652 | 7/1990 | Blotenberg | 415/27 |
| 4,947,643 | 8/1990 | Pollak et al. | 60/236 |
| 4,971,516 | 11/1990 | Lawless et al. | 415/1 |

*Primary Examiner*—Louis J. Casaregola
*Attorney, Agent, or Firm*—Thomas C. Stover; Donald J. Singer

[57] ABSTRACT

In a gas turbine engine a method for thrust variation with reduced compressor RPM excursion is provided in two modes which includes adjusting pivotable compressor vanes mounted upstream of compressor rotor blades, ahead of the conventional vane schedule therefor in a closed loop fashion, responsive to compressor corrected RPM, so as to adjust the fuel demand and engine thrust thereof while maintaining relatively high scheduled compressor corrected RPM scheduled as a function of fan corrected RPM while retaining the conventional method of fuel flow scheduling. Thus mode 1 of the invention adjusts the compressor vanes in advance of the conventional schedule therefor, e.g. precloses them on the deceleration side of the Bodie transient and appropriately opens them on the acceleration side of such transient subject to closed loop monitoring of the corrected compressor RPM and being guided thereby so as to result in reduced excursion in such RPM, during both legs of such transient. Because of such reduced RPM excursion, fast changes in engine thrust are possible. In mode 2 of the invention, snap accelerations of a gas turbine engine and its compressor, are assisted by opening the compressor vanes ahead of the conventional schedule therefor in an open loop fashion, not so much for compressor corrected RPM excursion advantage as for improved compressor stall margin. The methods of the invention thus emphasize the primacy of vane control over fuel flow control for reduced compressor RPM excursion in the first mode and increased stall margin in the second mode.

3 Claims, 4 Drawing Sheets

COMPRESSOR VANE CONTROL FOR GAS TURBINE ENGINES

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a method for thrust variation in a gas turbine engine with reduced compressor RPM excursion, particularly while maintaining a relatively high compressor corrected RPM.

2. Prior Art

In conventional or prior art thrust variation in a large majority of gas turbine engines, a particular schedule of variable vane angle (RCVV) against corrected compressor speed (N2C25) and engine inlet temperature (TT2) is employed both during steady state and transient operation. Thus in the prior art, during a Bodie transient, (full power to part power to full power or decel followed by accel), a fuel flow scheduling method is employed wherein the fuel flow is first decreased for decel purposes and later increased for accel purposes. This method, when done with the conventional vane scheduling referred to above, results in undesirable transient stall margin loss since the stator vanes (ahead of the compressor blades in such engine) lag or move only after the compressor speed or corrected RPM has changed. In addition, such conventional method results in large rotor speed changes or excursions during power changes, resulting in slower engine response (e.g. from part power to full power) as more fully discussed below with respect to FIG. 3 hereof.

A modification of such fuel flow control method is disclosed in U.S. Pat. No. 3,523,423 to Young (1970) where a low rotor RPM is regulated with exhaust nozzle modulation to prevent engine stall. In another prior art method given in U.S. Pat. No. 4,947,643 to Pollak et al. (1990), stator pivotal vanes and fuel flow are modulated in a coordinated fashion to hold constant corrected high rotor RPM.

In the first reference, fuel flow adjustment gives rise to stator vane lag with problems associated therewith, as noted above and further discussed below with respect to FIG. 3 hereof. The second reference discloses maintaining compressor corrected RPM constant by synchronizing vane angle and fuel flow modulation which can give rise to engine stability problems including fan stall.

The prior art fuel adjustment method also presents a problem in snap acceleration of a gas turbine engine from a steady state condition by, e.g. a steady state operating position of compressor vanes wherein a scheduled fuel increase, causes the compressor to operate at higher corrected RPMs before the stator vanes pivot open sufficiently, which causes a reduction in compressor air flow and an increase in combustor fuel-air ratio and the compressor approaches stall conditions for such engine. A similar stall threat is presented by the conventional method of fuel adjustment (operational in most aircraft engines) method on the accel side of a Bodie transient (part power to full power). The above stall margin concerns are discussed more fully below with respect to FIGS. 5, 6 and 7 herein.

Accordingly, there is a need and market for improved Bodie decel-accel procedure and a snap accel procedure which substantially obviates the above prior art shortcomings.

There has now been discovered, in a gas turbine engine, a method of compressor vane control for reduced compressor RPM excursion during a Bodie transient and/or a method for imparting a snap accel to such engine at an increased stall margin therefor, according to the present invention, while retaining the conventional method of fuel flow scheduling.

SUMMARY OF THE INVENTION

Broadly the present invention provides, in a gas turbine engine, a method for engine thrust variation, with reduced compressor RPM excursion comprising, pivoting compressor vanes located upstream of compressor rotor blades, ahead of the conventional steady state vane schedule therefor in a closed loop fashion, responsive to compressor corrected RPM, so as to vary fuel input and engine thrust while maintaining relatively high compressor corrected RPM scheduled as a function of transient fan corrected RPM. This scheduled transient N2 variation allows improved transient engine operation.

The above invention applies to engine thrust variation in a Bodie transient wherein engine thrust reduction is accomplished while maintaining relatively high compressor corrected RPM, in a closed loop fashion, with reduced compressor RPM excursion and increased transient compressor stall margin.

The method of the invention further includes providing engine thrust increase, in the second half of the above Bodie transient by closed-loop vane adjustment, wherein compressor corrected RPM is maintained at a high value as a function of fan corrected RPM, i.e. with reduced excursion thereof. The invention relates to an improved method of compressor vane (angle) control, while retaining the conventional method of fuel flow control. The transient N2 scheduling as a function of transient N1, permits successful Bodie transients within engine limits.

The invention further provides a gas turbine engine, for an improved snap accel from steady-state operating conditions, i.e. a steady-state operating position of compressor vanes, which vanes are pivotably mounted upstream of compressor rotor blades comprising, pivoting such vanes to an open position, ahead of the conventional steady state vane schedule therefor, to reduce the fuel/air ratio during the initial portion of the thrust increase thereby providing an increased stall margin.

Thus the invention described herein differs from the above stated prior art in that it relates to an improved method of high pressure compressor stator vane closed loop control while retaining conventional fuel flow control so as to regulate high pressure rotor (N2) RPM during a Bodie transient, to a relatively high value as a function of the transient fan rotor RPM. The advantages of such a method is discussed below with respect to FIGS. 2, 3 and 4. In another embodiment, the invention employs open loop vane scheduling during snap acceleration from a stabilized condition to increase high compressor stall margin, as indicated above.

Conventional vane (angle) scheduling for gas turbine engines is well known in the art and is described, e.g. in Technical Report AFAPL-TR-7735, F100 Multivariable Control Synthesis Program, Vol I, June 1977, at pp 19 & 20, which report is incorporated herein by reference.

BRIEF DESCRIPTION OF THE DRAWINGS

The invention will become more apparent from the following detailed specification and drawings in which.

DESCRIPTION OF PREFERRED EMBODIMENTS

Figure 1:
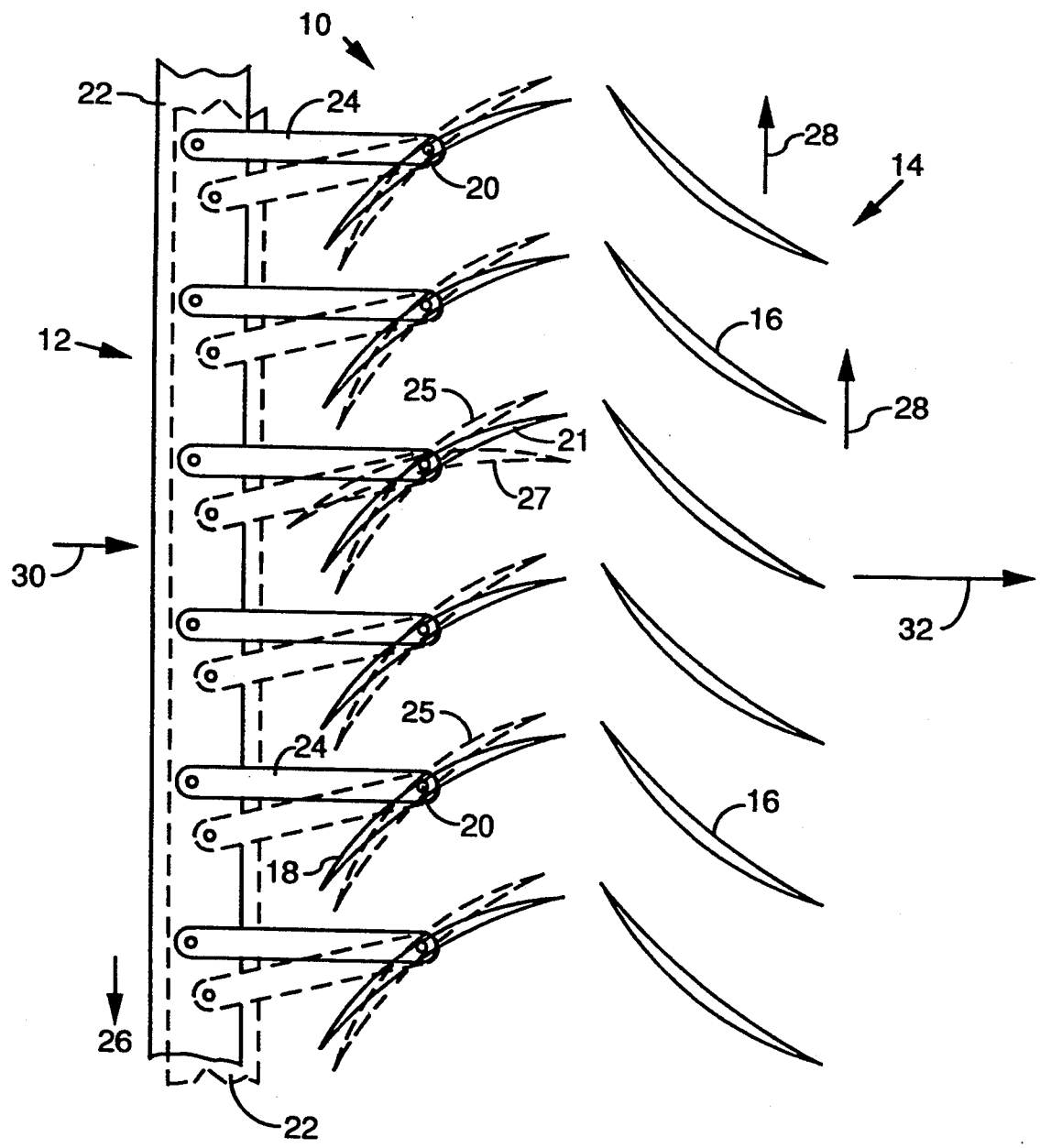
FIG. 1 is a sectional elevation schematic view of pivotable vanes upstream of compressor rotor blades in a gas turbine engine.

Referring to more detail to the drawings, in a gas turbine 10, a compressor stator vane 12 is positioned upstream of a compressor rotor 14, as shown in FIG. 1. As shown, the rotor 14 has blades 16 mounted thereon, while the stator 12 has vanes 18, each of which pivots on an axis 20 as directed by pivot ring 22 and bell cranks 24, e.g. to a more closed position 25 or a more open position 27, as shown in FIG. 1.

In the example of FIG. 1, the direction of the pivot ring 22 is given by arrow 26, and the direction of rotation of the rotor 14 is given by arrow 28, while the general direction of core air flow through the stator 12 and rotor 14 is given respectively by arrows 30 and 32, as shown in FIG. 1. All of this is prior art information.

Figure 2:
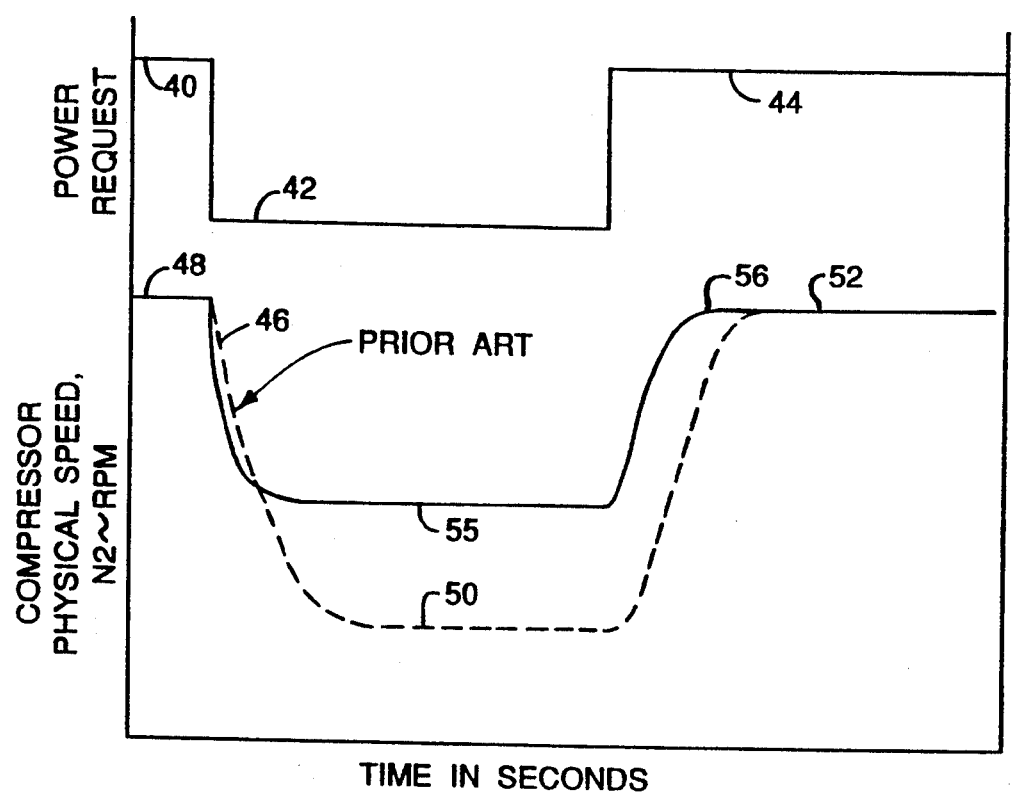
FIG. 2 is a graph of curves of compressor RPMs v time.

As noted above, in the prior art incorporated in most aircraft-gas turbine engines when the pilot of a gas turbine aircraft wishes to change from full power to reduced power, he cuts the fuel rate per, e.g. a (predetermined) fuel flow schedule, which causes the turbine and compressor RPMs to slow. As such RPMs slow, the schedule pivots the compressor vanes to a predetermined angle but it is after the fact, and the turbine and compressor slow excessively. Then when the pilot wishes to return his aircraft to full power, it takes longer for the compressor, turbine speed and thrust to come back up to full power. This above effect is shown in FIG. 2 hereof wherein compressor speed N2 is plotted against time. In such graph, full power line 40 is followed by an idle line 42, again followed by a full power line 44, as shown in FIG. 2. During such engine power sequence, prior art physical speed is shown by curve 46, wherein N2 at a full power high at 48 falls to a low at 50, during compressor idle and then back up to full power at 52, as shown in FIG. 2.

Figure 3:
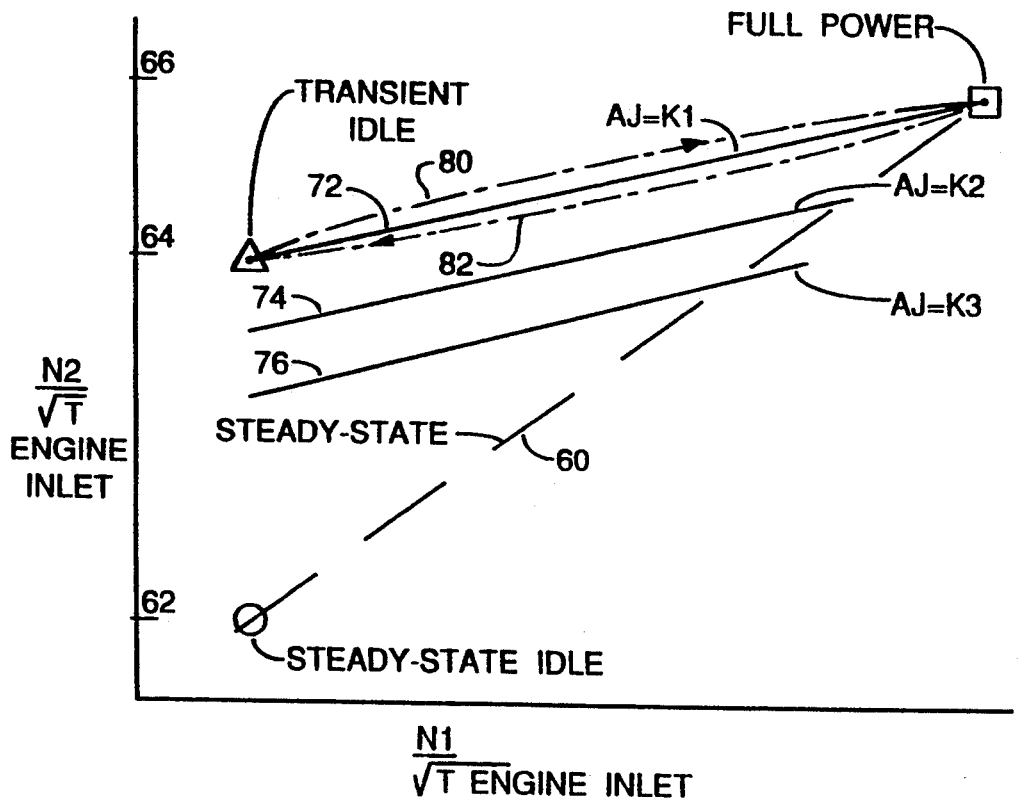
FIG. 3 is a graph of schedules of compressor corrected RPMs v corrected intake fan RPMs for such gas turbine engines.

Per the present invention, the above sequence of Bodie transient, is again performed not just by fuel flow scheduling but by also closing the compressor vanes, ahead of the conventional steady state vane schedule therefor, (e.g. line 95 of FIG. 5) to reach idle thrust while maintaining relatively high compressor RPMs or N2 therefor, per the schedule of FIG. 3, at line 55 of FIG. 2, at a reduced N2 excursion from the pre-high N2 of 48, which permits a faster return to full power, i.e. from an N2 of 55 back to a N2 of 56, as shown in FIG. 2. Thus a reduced descent in physical speed N2 of compressor RPMs and more rapid full power response time is seen in FIG. 2, per the present invention. That is one aim of the present invention, to keep compressor speed (in corrected RPMs) relatively high by pivoting vanes toward a closed position during decel so as to provide a shorter full power response time, as noted above. Thus, in one embodiment of the Invention, mode 1, a turbine engine is operated in a Bodie transient from high power to low power (decel) to high power (accel) in a closed loop fashion. That is, the vanes are closed on decel such that the corrected RPM of the compressor rotor is maintained relatively high and then on accel, such vanes are opened back toward the conventional steady state vane schedule therefor (and in advance of the response of lagging prior art vanes), while monitoring such corrected rotor speed, again to maintain it at a relatively high level, for a reduced excursion of such corrected RPM as discussed above.

The prior art and the invention are further compared in FIG. 3 hereof, in which N2, compressor RPM (or $N2/\sqrt{T}$ engine inlet, i.e. corrected compressor RPM or N2C2) is plotted against Fan RPM (or $N1/\sqrt{T}$ engine inlet, i.e. corrected Fan RPM or N1C2). Curve 60 in FIG. 3, shows the steady state operation for both the prior art and the invention and also the transient operation of the prior art for N2 against N1, in which a considerable excursion of N2 is seen from points 62 to 66, as N1 rises in FIG. 3.

Transient operating lines 72, 74 and 76 of FIG. 3, show three different transient operating schedules according to the invention, for three different exhaust nozzle throat openings, K1, K2 and K3, respectively. Thus for a given throat opening of K1, i.e. line 72, variable compressor vanes are modulated in a closed loop fashion, utilizing the compressor RPM feedback to hold a relatively high value of compressor RPM (N2) during a Bodie transient (full power to part power to full power). This high value of compressor RPM (N2) can be achieved transiently by modulating the compressor stator vanes until a desired N2C2 transient schedule is satisfied.

The definitions of N2, N2C2, and N2C25 herein are summarized as follows:

N2 is actual compressor (rotor) speed in RPM,
N2C2 is $N2/\sqrt{T}$ engine inlet and
N2C25 is $N2/\sqrt{T}$ engine inlet.

N2C2 and N2C25 are both known as "corrected compressor RPM" but the value of N2C2 is higher than N2C25 since T engine inlet is lower than T compressor inlet. For a fixed engine inlet temperature, N2C2 is equal to CONSTANT x N2 or K(N2).

Similarly, N1 is actual engine fan speed, in RPM, N1C2 is $N1/\sqrt{T}$ engine inlet and is "corrected fan RPM". Maintaining this desired high transient compressor speed (RPM) to fan speed (RPM) relationship has several advantages in engine operation. Under steady-state operation, N2 varies with N1 according to the dashed line 60 shown in FIG. 3. The invention proposes that under transient Bodie condition (accel line 80 and decel line 82 per FIG. 3) compressor vanes be modulated in a closed loop fashion by obtaining the instantaneous compressor RPM N2 (or $N2/\sqrt{T}$ engine inlet) and comparing it to the high transient value given by the transient schedule depicted as solid lines 72, 74 and 76 (FIG. 3), to obtain any error and adjusting the vanes to null that error. In this way, a much higher transient N2 RPM is obtained at any given N1. This results in fast change in engine thrust because the compressor RPM excursion is small. Thus in the case of transient line 72, that excursion runs from 64 to 66 in FIG. 3. The above transient schedules of FIG. 3 are particularly advantageous in turbo fan engines where nozzle area AJ, is often variable. Also compressor stall margin remains high as discussed below.

Figure 4:
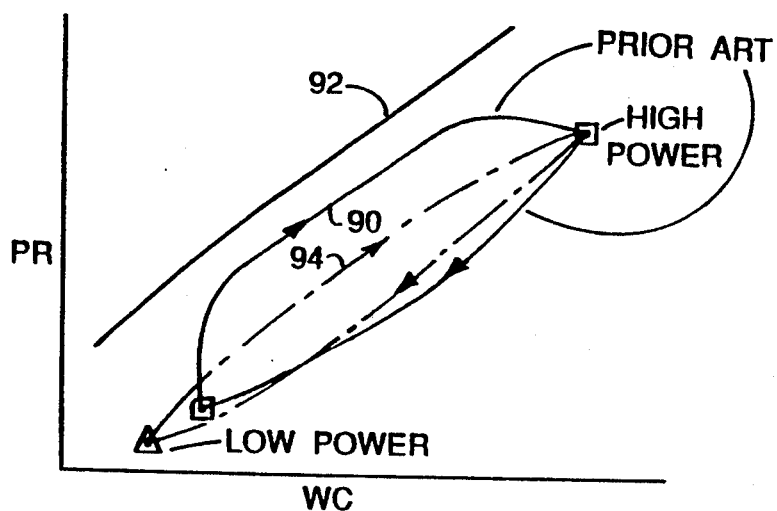
FIG. 4 is a graph of Bodie transient operation relative to compressor stall limit.
Figure 6:
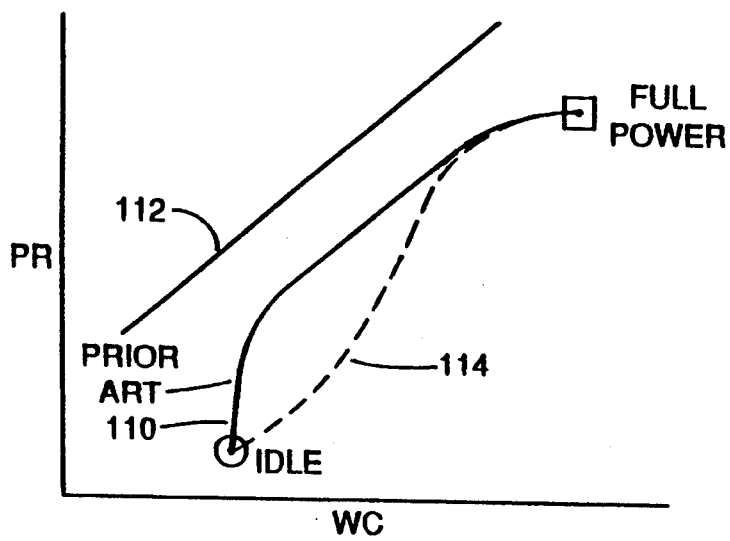
FIG. 6 is a graph of snap acceleration from a steady-state vane position relative to compressor stall limit and FIG. 7 is a schematic block flow diagram of control logic compressor vane adjustment according to the present invention.

In FIGS. 4 and 6, PR is plotted against WC. PR is compressor exit pressure/compressor inlet pressure while WC is compressor corrected flow i.e. flow W $\sqrt{T}$ /P at the compressor inlet.

Accordingly, per FIG. 4 hereof, on the accel side of the Bodie transient, the prior art (as incorporated in a majority of gas turbine engines) accel line 90 (of increasing fuel flow and vane opening lag) approaches the compressor stall line 92. However, in the closed loop N2 method of invention, the corresponding accel line 94 is well spaced from such stall line 92, resulting in a relatively high stall margin, as shown in FIG. 4. That is, there is a lesser shift in the compressor transient operating line 94 than in the prior art line 90 toward the stall line 92. Again the invention thus succeeds because here the vanes are being opened toward the conventional schedule (and in advance of the response of lagging prior art vanes), thus keeping the transient fuel/air ratio low for a substantial portion of the accel.

Further according to the method of the present invention, decels and Bodie transients are performed at high N2C2 (corrected compressor RPMs) made possible by closed-loop control, utilizing proportional, integral and derivative vane trim. In this mode the compressor operates at a low ratio of axial flow velocity to rotor speed (CX/U), resulting in significant transient stall margin advantage. Also as noted above, the reduced compressor rotor RPM excursion results in fast thrust response, e.g. per FIGS. 2 and 3 hereof.

In another embodiment or mode 2 of the present invention, snap accels of gas turbine engines are facilitated. For example, a turbine engine is at low power or idle or at a steady state, operating position of compressor vanes and a thrust increase is called for. The prior art teaches that for a snap accel, one increases the fuel flow, according to a schedule and the vanes will follow. However, with this procedure, the fuel/air ratio during the initial portion of the accel is high, raising the transient operating line toward the stall limit.

Figure 5:
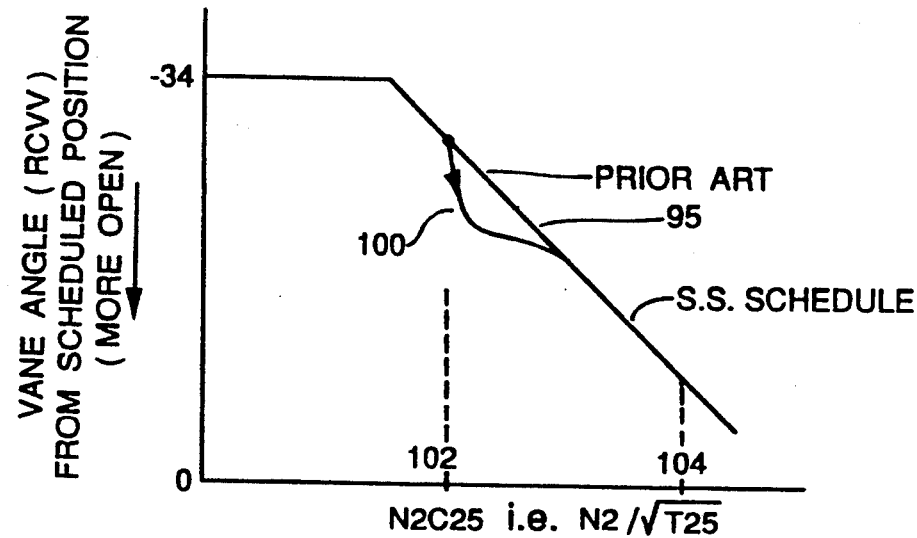
FIG. 5 is a graph relative to snap acceleration from a steady-state position of stator vanes.

Thus per FIG. 5, wherein vane opening is plotted against N2C25 or N2/$\sqrt{T25}$ (that is, compressor speed over compressor inlet temperature, i.e. corrected compressor speed). Here the prior art snap accel is shown as line 95, wherein as corrected N2 increases (due to increased fuel schedule), the compressor vanes open, though in a lagging manner per FIG. 5 (since vanes open only after the corrected N2 has increased).

In a snap accel per the present invention, the vanes are pre-opened per curve 100, which curve then merges with descending prior art line 95 such that as corrected N2 increases, the vane openings increase per FIG. 5. Here though the corrected N2 excursion is the same for the two "curves", e.g. from 102 to 104, the benefit of the snap accel method of the invention, is the increased compressor stall margin as discussed below.

Relating FIGS. 5 and 1, on the ordinate (of FIG. 5) is "Vane Angle From Scheduled Position" (e.g. at position 21 of FIG. 1) which vanes pre-pivot to a less negative (more open) position on a snap accel, e.g. to position 21 of FIG. 1.

That is, mode 2 of the invention addresses an open loop vane scheduling method for an acceleration from the above described steady state condition. In this mode the vanes are opened ahead of the conventional steady state schedule a prescribed amount, resulting in an increased stall margin due to a lower excursion in the compressor transient operating line, per FIG. 6, discussed below.

At all times herein relative to the methods of the invention, the fuel flow scheduling is in the conventional manner for gas turbine engines.

Relative to stall margin, per FIG. 6 herein, the snap accel of the prior art is shown as curve 110 (of increasing fuel flow with vane opening lag), which curve 110 approaches the compressor stall line 112. However, the snap accel method of the invention, shows a corresponding accel line 114, which is well spaced from such stall line 112, for a relatively high stall margin per FIG. 6 hereof. Thus according to mode 2 of the present invention, for a snap accel, the vanes are opened ahead of the conventional steady state schedule, which permits increased corrected air flow through the compressor for the same N2C25, for a lower fuel/air ratio ( lower combustor temperature ) and higher stall margin, per FIG. 6 hereof.

Figure 7:
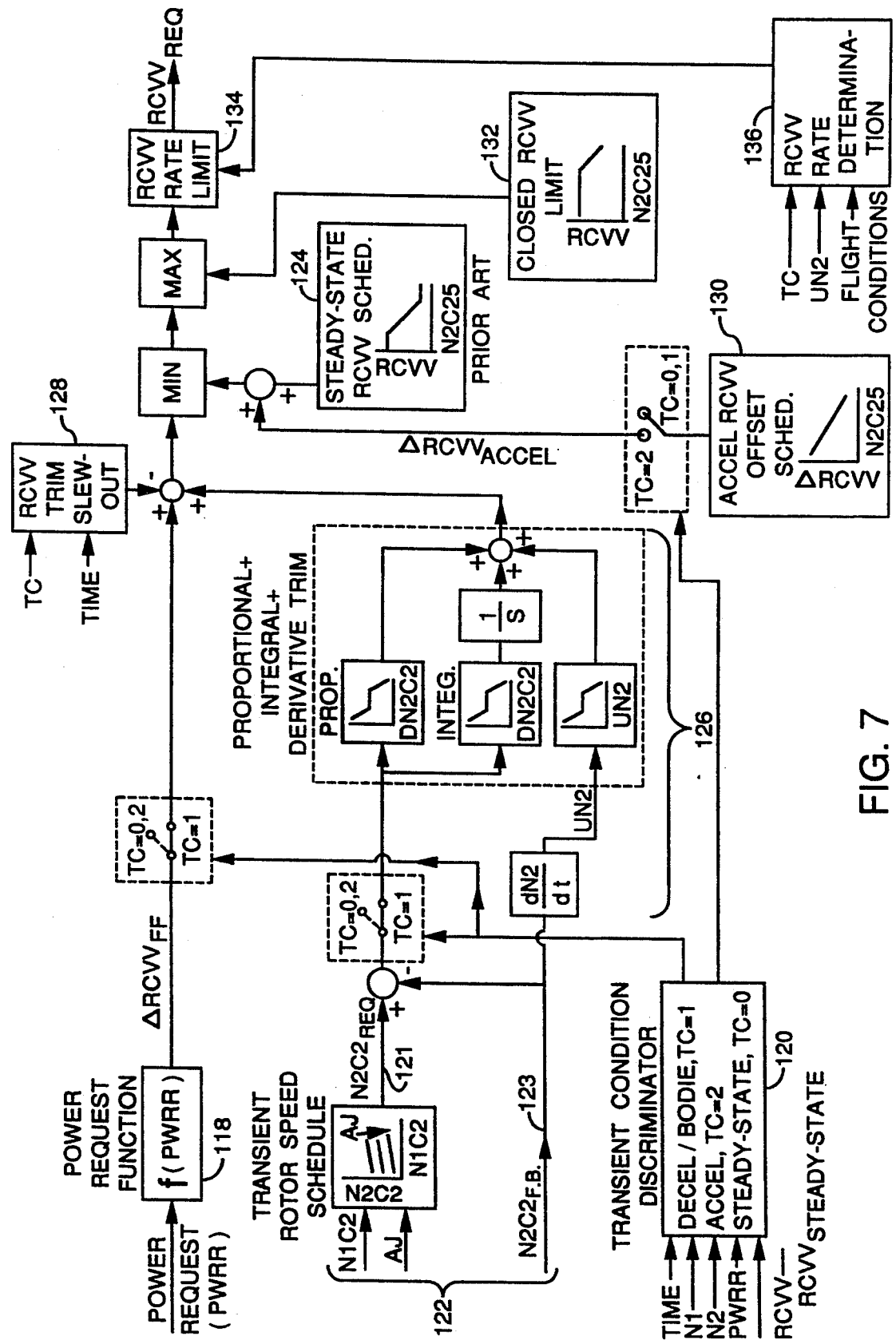

The above methods embodying the invention, modes 1 and 2, can be managed by logic controls, e.g. as shown in FIG. 7 hereof.

An example of the control logic for modes 1 and 2 of the invention is shown in FIG. 7. As shown, the proactive compressor vane control (PCVC), also referred to as Improved Compressor Control (ICVC), is initiated upon power request (PWRR) 118, e.g. by the aircraft pilot. The Transient Condition Discriminator 120 identifies three signals; TC=1(Decel/Bodie Closed Loop); TC=2, Accel (open loop) and TC=0, steady state in compressor vane position and fuel flow scheduling according to the prior art. Such Discriminator 120 checks the compressor vane positions against scheduled values therefor.

a. For steady state conditions, TC=0 is selected which turns off all the switches of PCVC logic resulting in compressor vane (RCVV) scheduling according to the Steady-State RCVV Schedule 124 (per the prior art), as shown in FIG. 7.

b. For decels and Bodie transients, TC=1 is selected, resulting in the following closed-loop feedback-control. The Power Request Function Logic 118 provides a feed-forward RCVV value(RCVV$_{FF}$). The Transient Rotor Speed Schedule 122 provides an N2C2$_{REQ}$ (request value) 121, which is compared to an N2C2$_{FB}$ (feedback value) 123 and the error activates the Proportional+integral+Derivative (PID) Trim Circuit 126 to null the error resulting in the desired N2C2, as indicated in FIG. 7. That is, the Discriminator 120 checks the vane position against a scheduled value and the Schedule 122 moves (closes or opens) each vane until the difference with its scheduled value or position goes to 0.

Upon command from the RCVV Trim Slew-Out logic 128, the above PID Trim can be washed out (removed) at a gradual rate, returning the compressor operation to the Steady-State RCVV Schedule 124.

c. For engine acceleration with the compressor vanes on the Steady State Schedule (TC=0), TC is set to 2, which turns off the closed loop circuit and activates the open loop scheduling, utilizing the Accel RCVV Offset Schedule 130 to pre-open the vanes, as indicated in FIG. 7. This offset modifies the Steady-State RCVV Schedule 124 in an optimum manner, resulting in low accel fuel-air ratios, thus providing increased accel stall margin.

Other logic controls shown in FIG. 7, include Schedule 132 which limits the closure of the vanes beyond a desired value. Also shown is control 134 which limits the rate at which the vanes move according to determinations of compressor transients by the Control 136.

The above control logic of FIG. 7 is an example of suitable logic employed to perform modes 1 and 2 of the present invention. Variations on such control logic can be employed within the scope of the present invention.

The method of the invention thus provides for thrust variation with reduced compressor RPM excursion, while maintaining relatively high N2, to permit a) fast thrust changes and also to provide b) increased compressor stall margin during the thrust variation.

Thus mode 1 of the invention adjusts the compressor vanes in advance of the conventional schedule therefor, e.g. pre-closes them on the decel side of the Bodie transient and appropriately opens them on the accel side of such transient, subject to closed loop monitoring of the compressor corrected RPM vs corrected fan RPM schedule and being guided thereby so as to maintain a reduced excursion in such RPM, during both legs of the transient. Because of such reduced RPM excursion, fast changes in engine thrust are possible.

In mode 2 of the invention, snap accels (or more gradual accels) of a gas turbine engine and its compressor, are assisted by opening the compressor vanes ahead of the conventional schedule therefor in an open system, not so much for compressor corrected RPM excursion advantage as for improved (increased) compressor stall margin.

Improved stall margin is also obtained per mode 1 of the invention as well as a reduced compressor corrected RPM excursion.

What is claimed is:

1. A method for thrust variation with reduced compressor RPM excursion in a gas turbine engine having in downstream order, a fan, pivoting compressor vanes and compressor rotor blades, which engine is operated during a deceleration and during a follow-on acceleration comprising:
   a) comparing compressor corrected RPM, $N2/\sqrt{T}$ Engine inlet, with the value given by a transient schedule for a given Aj on a plot of said $N2/\sqrt{T}$ Engine Inlet, against corrected fan RPM, $N1/\sqrt{T}$ Engine Inlet,
   b) noting any deviation between $N2/\sqrt{T}$ Engine Inlet and said value,
   c) pivoting said vanes to correct said deviation and
   d) repeating such steps as guided by said schedule, in a closed loop fashion responsive to compressor corrected RPM, so as to vary fuel demand and engine thrust while maintaining a relatively high compressor corrected RPM scheduled as a function of fan corrected RPM.

2. The method of claim 1 for performing engine thrust reduction or deceleration comprising, closing said vanes as guided by said schedule.

3. The method of claim 2 for performing engine thrust increase or acceleration following said deceleration, comprising reopening said vanes as guided by said schedule.

* * * * *